Feb. 6, 1951      D. A. WALLACE      2,540,973
POWER TRANSMISSION MECHANISM
Filed Jan. 10, 1947      2 Sheets—Sheet 1
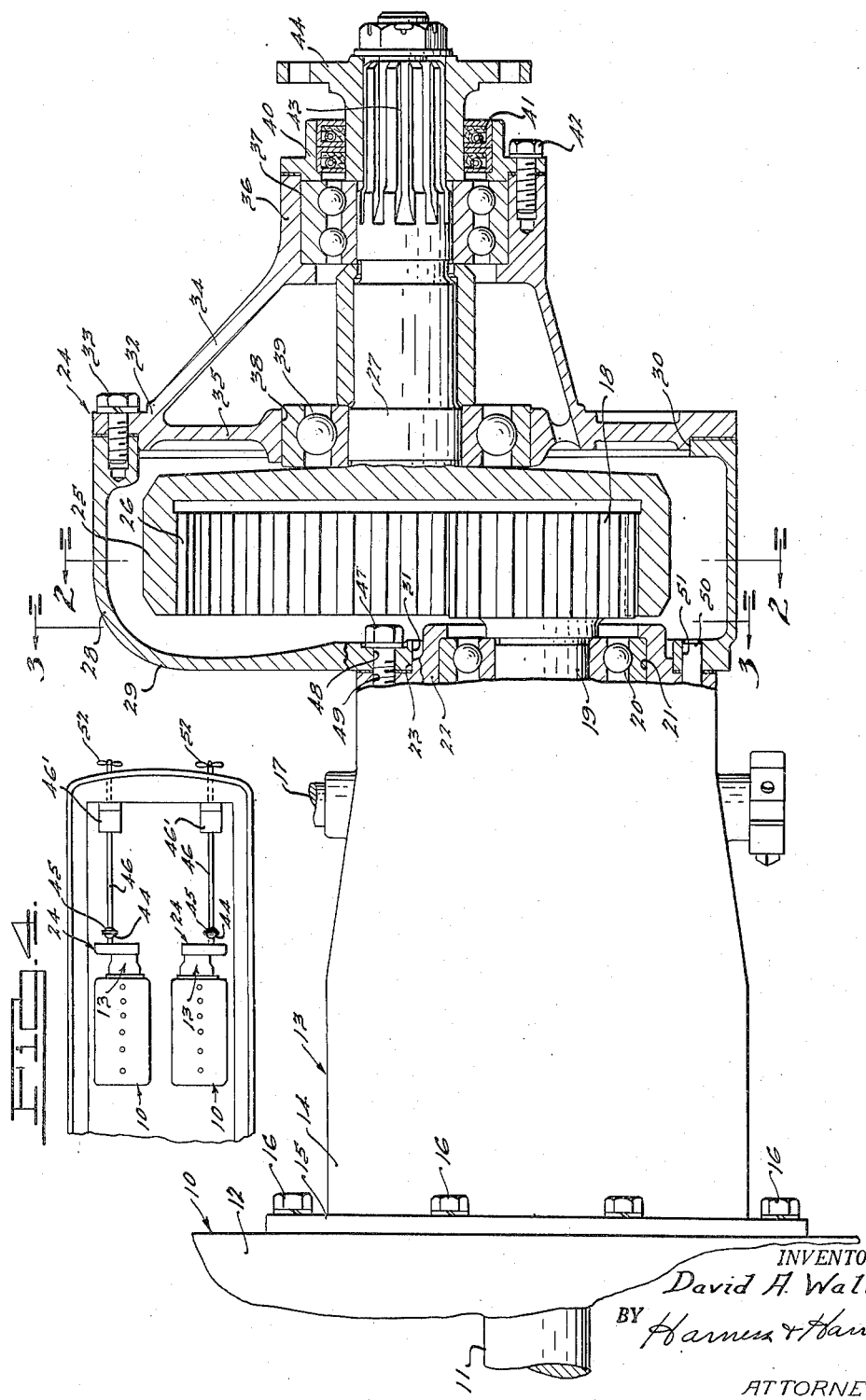
INVENTOR.
David A. Wallace.
BY Harness & Harris,
ATTORNEYS.

Feb. 6, 1951 D. A. WALLACE 2,540,973
POWER TRANSMISSION MECHANISM
Filed Jan. 10, 1947 2 Sheets-Sheet 2

INVENTOR.
David A. Wallace.
BY Harness & Harris
ATTORNEYS.

UNITED STATES PATENT OFFICE 2,540,973

POWER TRANSMISSION MECHANISM

David A. Wallace, Grosse Pointe Farms, Mich., assignor to Chrysler Corporation, Highland Park, Mich., a corporation of Delaware Application January 10, 1947, Serial No. 721,424

2 Claims. (Cl. 74—413)

This invention relates to an improved driving mechanism for transmitting driving power from an engine to a driven member.

More specifically the invention pertains to drive transmitting mechanism which is particularly adapted for transmitting the drive from an engine of a boat to its propeller shaft.

One of the main objects of the invention is to provide power transmitting mechanism of this kind which can be variably assembled to position a final driven, or other, shaft at a large variety of selected offset angularly spaced locations about the axis of the next adjacent member of a train of driving members.

A further object of the invention is to provide improved gearing and gear casing structure for transmitting the drive from a marine engine to a propeller shaft which is adapted to be variably assembled to raise or lower the axis of the propeller shaft at its driven end to meet the requirements of a large variety of boat constructions.

Another object of the invention is to provide improved gearing and gear casing structure of this character in a marine propulsion unit which can be variably assembled to adapt units of identical construction for port and starboard installation in a boat having duel propeller drive.

A still further object of the invention is to provide improved gearing and gear casing structure of this kind which can be variably assembled to accommodate greater lateral spacing of the propeller shaft axes of a duel propeller drive installation than that required between the axes of the crankshafts of the engines by which the propeller shafts are driven.

An additional object of the invention is to provide gearing and gear case structure of this character which can be constructed in various sizes and applied to engines of identical construction for effecting various gear ratio drives between the engines and the shafts driven thereby.

An illustrative embodiment of the invention is shown in the accompanying drawings, in which:

Fig. 1 is a fragmentary top plan view, partly in section, of an engine transmission having power takeoff gearing embodying the invention.

Fig. 4 is a fragmentary top plan view of a boat equipped with a pair of engines having power transmission mechanism embodying the invention.

Figure 3:
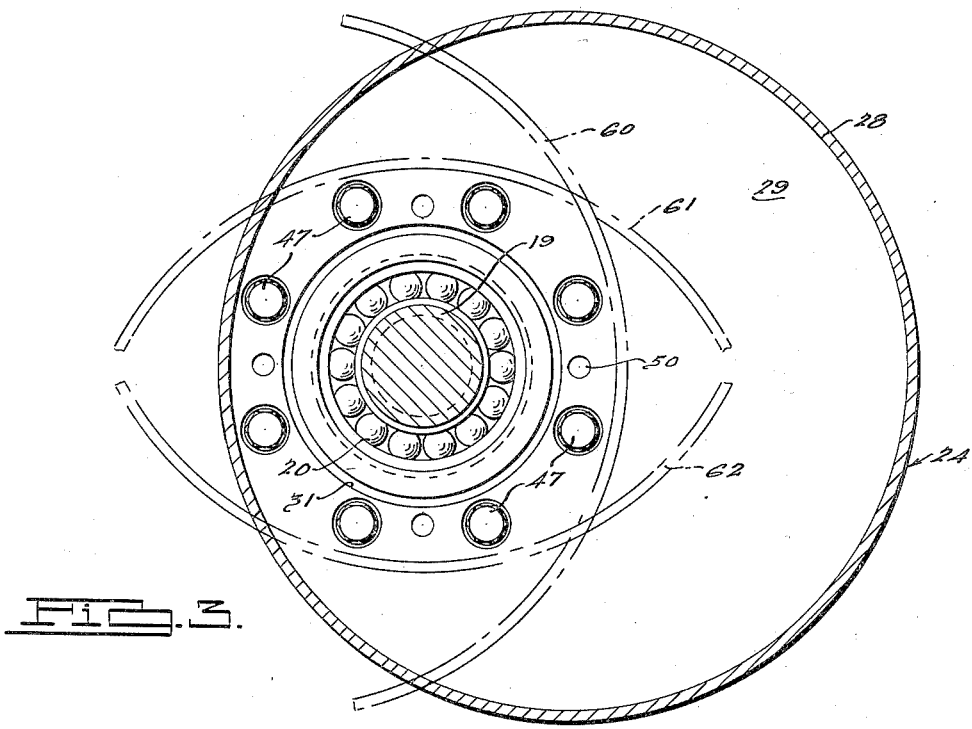
Fig. 3 is a transverse sectional view taken on line 3—3 of Fig. 1 and illustrating in dotted lines several of the various positions in which the structure may be disposed.

In the form of the invention shown in the drawing my improved engine and power transmitting unit comprises an engine generally designated by the numeral 10 having a crankshaft 11 and a crankcase 12 on which is mounted transmission mechanism generally designated by the numeral 13. The transmission mechanism comprises a housing 14 having a flange 15 secured by bolts 16, or other suitable means, to the end of the crankcase 12. This transmission mechanism may comprise reduction or other gearing confined within the housing 14 and it may include reverse mechanism (not shown). The gearing or reverse mechanism may be controlled by control shaft 17, or other suitable means. The final drive member of the transmission mechanism 13 comprises a pinion 18 having a shaft portion 19 journaled in a bearing 20 which is disposed in an opening 21 provided in the end wall structure 22 of the transmission housing 14. This end wall 22 of the transmission housing 14 is also provided with a pilot shoulder 23 which is substantially concentric with the bearing 20 and opening 21.

Mounted on the transmission housing 14 is a power takeoff unit generally designated by the numeral 24 which comprises a ring gear member 25 having internal teeth 26 meshed with the teeth of the pinion 18. The ring gear member 25 includes a shaft portion 27 which is disposed on the side of the toothed ring portion of the ring gear member opposite from the pinion 18. The pinion 18 and ring gear member 25 is enclosed within a casing comprising a cylindrical body portion 28 which is provided with an end wall 29 and an open end 30. The end wall 29 has an opening 31 in which the pilot shoulder 23 of the end wall of the transmission housing 14 is receivable for properly positioning the casing 24 on the end of the transmission housing.

The open end 30 of the body portion 29 of the casing 24 is provided with a cover portion 32 which is removably mounted on the open end of the body portion 29 by bolts 33. The cover portion 32 includes a generally frustro-conical wall 34 and a radially extending web 35. The wall 34 terminates in a cylindrical sleeve portion 36 in which is mounted a bearing 37. The radial web 35 has an opening 38 in which is mounted a bearing 39. The shaft portion 27 of the ring gear member 25 is journaled in the bearings 37 and 39 for rotation about an axis which is offset from the axis of the pinion 18. The terminal sleeve portion 36 of the cover portion 32 is provided with sealing means comprising a closure 40 and sealing rings 41 which are removably mounted on the sleeve portion 36 by bolts 42. The right end of the shaft portion 27 of the ring gear member 35 is splined as illustrated at 43 in Fig. 1, for receiving the correspondingly splined coupled element 44 of a universal joint unit 45, shown in Fig. 4. The closure element 40 and the coupling element 44 abut the outer and inner races, respectively, of the bearing 37 and retain the ring gear member 25 and cover portion 32 in a unitary assembly. As illustrated in Fig. 4, the universal joint element 45 is used to operatively connect the shaft portion 27 of the ring gear member 25 to a propeller shaft 46 such as that employed in boat power unit installations. In such installations the propeller shaft 46 extends through a stuffing box 46' to the exterior of the boat hull.

Figure 2:
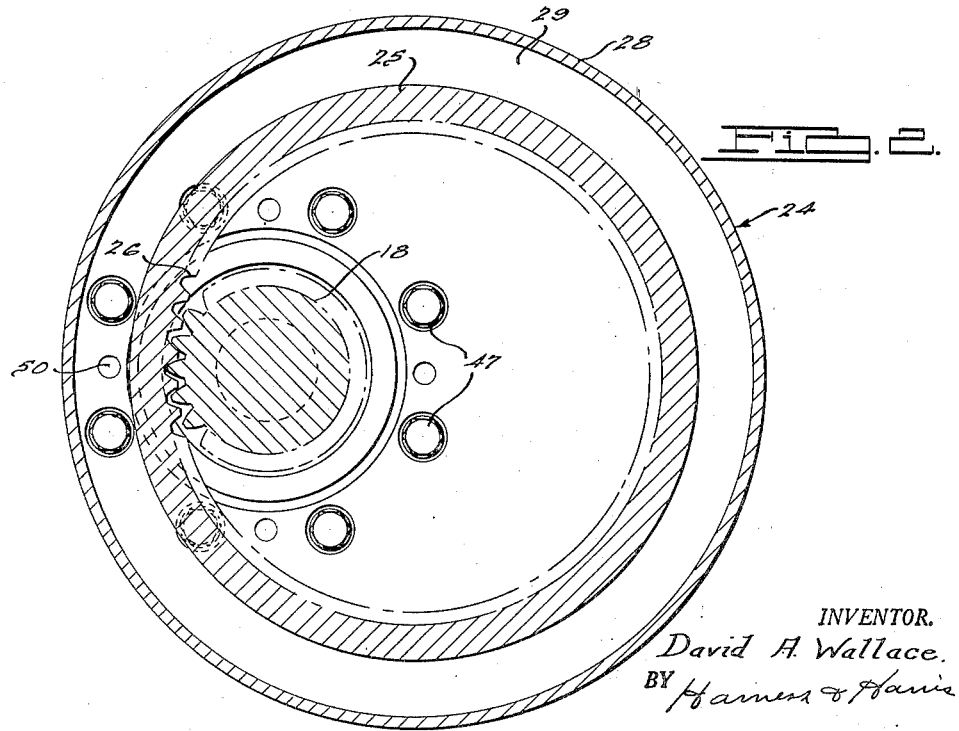
Fig. 2 is a transverse sectional view taken on the line 2—2 of Fig. 1.

The casing 24 is piloted on the shoulder 23 of the transmission housing 14 and is detachably secured to the latter by bolts 47. The bolts 47, as shown in Figs. 1, 2 and 3 are uniformly spaced about the axis of the pinion 18 and are received in apertures 48 formed in the end wall 29 of the casing 24 and in registering threaded apertures 49 in the end of the transmission housing 14. The apertures 48 and 49 are uniformly spaced and equidistant from the axis of the pinion 18 in order to accommodate assembling of the transmission housing 14 and casing 24 in diverse angular relationships. The axis of the shaft portion 27 of the ring gear 25 is offset with respect to the axis of the pinion and the direction of offset between these axes can be predetermined by selective angular location of the casing 24 relative to the transmission housing 14. In Fig. 3 of the drawing the casing 24 is shown in full lines in its extreme right-hand position so as to locate the axis of the ring member in its extreme right-hand position. The fragmentary dot and dash illustration designated by the number 60 in Fig. 3 represents the extreme left-hand position of the casing 24 which would place the axis of the ring gear member 25 at its extreme left-hand position. The fragmentary dot and dash illustration designated by the number 61 in Fig. 3 illustrates the lowermost position of the casing 24 which would place the axis of the ring gear member 25 at its lowermost position. The dot and dash lines designated by the number 62 in Fig. 3 illustrates the uppermost position of the casing 24 which would place the axis of rotation of the ring gear member 25 at its corresponding uppermost position. In the form shown in the drawings, eight bolts 47 spaced forty-five degrees apart are employed and four guide pins 50, spaced ninety degrees apart, are mounted on the end of the transmission casing 14 and receivable in registering apertures 51 formed in the end wall 29 of the casing. With this arrangement of bolts 47 and guide pins 50 the casing 24 may be arranged with respect to the transmission housing 14 in any one of four different positions illustrated in Fig. 3 so as to space the axis of the shaft portion 27 of the ring gear member 25 either vertically upwardly or downwardly with respect to the axis of the pinion 18 or horizontally in either direction with respect to the latter axis. Extra apertures 51 (not shown) may be provided in the wall 29 of the casing 24 midway between successive apertures shown in the drawing in order to accommodate further variations in the angular relationship between the casing 24 and transmission housing 14, if desired. Any desired number of uniformly spaced bolts 47 may be employed and the pins 50 may be omitted if desired to adapt the structure for further angular variation between the transmission housing 14 and casing. The bolts 47 are accessible through the open side 30 of the casing 34 when the cover member 32 thereof and ring gear member 25 which is journaled in the cover are removed.

The variability of the relative angular relationship between the transmission housing 14 and the casing 24 and the accompanying variation in the direction of offset of the axis of the shaft 27 with respect to the axis of the pinion 18 is particularly desirable and useful in boat installations for hull structures are frequently, if not usually, custom-built and there is considerable variation in engine placement as well as hull construction. This flexibility in the relative positions of the power takeoff unit, which is conventionally coupled to the propeller shaft, and the engine crankshaft and final drive member of the transmission readily facilitates installation of identical marine power units in boats of a wide variety of construction for the propeller shaft can be offset with respect to the crankshaft axis or the axis of the final drive member of the transmission in any desired direction as required by the various hull constructions.

The flexibility provided by this engine is particularly useful in dual marine power installations for, as illustrated in Fig. 4, two power units of identical construction may be installed with the engines thereof in side by side adjacency and the axes of the propeller shafts may be spaced apart considerably further than the axes of the engines or engine crankshafts in order to afford a compact arrangement of the engines and a wide spacing of the propellers 52 which are mounted on the propeller shafts 46, a wide spacing of the propellers 52 being desirable in order to avoid turbulence created by one propeller from injuriously affecting the action of the other propeller. Such wide spacing of the propeller overcomes interference of the slipstream from one propeller with the slipstream of the other propeller.

Although but one specific embodiment of the invention is herein shown and described, it will be understood that various changes in the sequence of operations, steps and materials employed may be made without departing from the spirit of the invention.

I claim:

1. Transmission mechanism comprising a housing having an opening in one end and an annular pilot portion surrounding said opening and projecting outwardly from said housing, a rotative member journaled in said housing concentrically with respect to said annular pilot portion including a pinion projecting outwardly of said housing beyond the opening thereof, an internal ring gear member comprising a ring portion having internal teeth meshed with the teeth of said pinion and a concentrically disposed shaft portion on the side of said ring portion opposite from said pinion, a casing comprising a cylindrical body portion having an open end and an opposite end wall provided with a circular opening for receiving said annular pilot portion of said housing and comprising a cover portion detachably secured on the open end of said body portion, bearings in said cover portion for receiving the shaft portion of said ring gear member and rotatably supporting the latter on an axis offset from the axis of said pinion, means for retaining said ring gear and cover portion in a unitary assembly and means for detachably securing said body portion of said casing to said housing in any one of a plurality of different relative angular positions for predetermining the direction and amount of offset of the axis of said ring gear member from the axis of said pinion, said means comprising threaded members extending through openings in said end wall of said casing, threaded in said housing and being accessible through the interior of said casing when said ring gear member and cover portion assembly is removed.

2. Transmission mechanism comprising a housing having an opening in one end and a plurality of uniformly spaced threaded apertures arranged concentrically about the axis of said opening, a rotative member journaled in said housing including a pinion projecting outwardly of said housing beyond said opening, a pilot element on said housing concentric with the axis of rotation of said rotative member and projecting outwardly from said housing an internal ring gear member comprising a ring portion having internal teeth meshed with the teeth of said pinion and a concentrically arranged shaft portion on the side of said ring portion opposite from said pinion, a casing comprising a body portion having an open end and an opposite end wall adjacent said end of said housing provided with an opening for receiving said pilot element and for accommodating passage of said pinion into said casing and having a plurality of uniformly spaced apertures registerable with the threaded apertures of said housing in various relative angular positions of said housing and casing, said casing including a cover portion detachably secured on the open end of said body portion, bearings in said cover portion for receiving the shaft portion of said ring gear member and rotatably supporting the latter on an axis offset from the axis of said pinion, and a plurality of bolts having head portions disposed in said casing and accessible through the open end of the latter and having stem portions extending through the apertures of said casing end wall and threaded in the apertures of said housing for securing said body portion of said casing and said housing in any one of a plurality of different relative angular positions in order to predetermine the direction of offset of the axes of said ring gear member and pinion.

DAVID A. WALLACE.

REFERENCES CITED

The following references are of record in the file of this patent:

UNITED STATES PATENTS

| Number | Name | Date |
| --- | --- | --- |
| 1,122,647 | Russell | Dec. 29, 1914 |
| 1,929,196 | Waddell | Oct. 3, 1933 |
| 1,953,199 | Snyder | Apr. 3, 1934 |
| 2,040,287 | Ware | May 12, 1936 |

FOREIGN PATENTS

| Number | Country | Date |
| --- | --- | --- |
| 113,990 | Great Britain | Mar. 11, 1918 |